Patented May 24, 1927.

1,629,885

UNITED STATES PATENT OFFICE.

HEINRICH POLIKIER, OF LEIPZIG, AND HERBERT HÄHLE, OF DESSAU-ZIEBIGK, GERMANY, ASSIGNORS TO I. G. FARBENINDUSTRIE AKTIENGESELLSCHAFT, OF FRANKFORT-ON-THE-MAIN, GERMANY.

TRIARYL-METHANE DYESTUFFS FROM TETRAALKYL-DIAMINO-BENZOPHENONES AND DI-1-NAPHTHYL-ETHYLENE-DIAMINE.

No Drawing. Application filed May 6, 1926, Serial No. 107,228, and in Germany April 9, 1925.

By the present invention blue violet dyestuffs of the triarylmethane series are made by the reaction between di-1-naphthylethylenediamine and tetraalkyl-4.4'-diaminobenzophenone used in the proportion of 1 molecule of the former to two molecules of the latter. The dyestuffs correspond to the general formula:

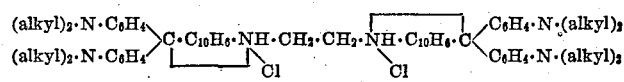

The new dyestuffs are characterized by remarkable clarity, colour strength and fastness to washing. In their other dyeing properties they approximate the Victoria blue group (see Schultz, "Farbstofftabellen", 6. Edition, 1. Vol., Nr. 558 and 559).

The following example illustrates the invention without limiting it, the parts being by weight:

54 parts of tetramethyl-4.4'-diaminobenzophenone, 31 parts of di-1-naphthylenediamine and 30 parts of toluene are melted together. To the mixture, which is cooled to about 60° C. there are added 36 parts of phosphorus-oxychloride and the whole is stirred on the water bath until it becomes solid. The mass is then stirred in 1000 parts of hot water and the dyestuff is separated in crystalline form by adding a little sodium chloride to the solution. The dyestuff dyes wool and cotton mordanted with tannin clear blue violet.

Tetraethyl - 4.4' - diaminobenzophenone yields on condensation with di-1-naphthylethylenediamine a dyestuff of similar properties.

What we claim is:

1. The herein-described blue violet dyestuffs of the triarylmethane series which correspond to the general formula:

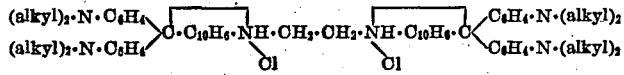

and which are substantially identical with the dyestuffs manufactured by the reaction between di-1-napthylethylenediamine and tetraalkyl-4.4'-diaminobenzophenone used in the proportion of 1 molecule of the former to 2 molecules of the latter.

2. The herein-described blue violet dyestuff of the triarylmethane series which corresponds to the general formula:

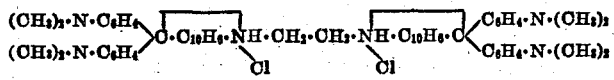

and which is substantially identical with the dyestuff manufactured by the reaction between di-1-naphthylethylenediamine and tetramethyl-4.4'-diaminobenzophenone used in the proportion of 1 molecule of the former to two molecules of the latter.

In testimony whereof we affix our signatures.

HEINRICH POLIKIER.
HERBERT HÄHLE.